(12) United States Patent
Jacson et al.

(10) Patent No.: US 7,976,766 B2
(45) Date of Patent: Jul. 12, 2011

(54) MOLD, METHOD AND INSTALLATION FOR BLOW-MOLDING THERMOPLASTIC CONTAINERS PROVIDED WITH AN INTEGRAL HANDLE, AND CONTAINER THUS PRODUCED

(75) Inventors: Olivier Jacson, Octeville-sur-Mer (FR); Marc Michelet, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 631 days.

(21) Appl. No.: 12/063,628

(22) PCT Filed: Aug. 8, 2006

(86) PCT No.: PCT/FR2006/001924
§ 371 (c)(1),
(2), (4) Date: Jun. 27, 2008

(87) PCT Pub. No.: WO2007/020346
PCT Pub. Date: Feb. 22, 2007

(65) Prior Publication Data
US 2009/0139996 A1    Jun. 4, 2009

(30) Foreign Application Priority Data
Aug. 18, 2005   (FR) ...................... 05 08604

(51) Int. Cl.
*B29C 49/50*   (2006.01)

(52) U.S. Cl. ........................................ 264/534; 425/525
(58) Field of Classification Search .................. 425/525; 264/534
See application file for complete search history.

(56) References Cited

U.S. PATENT DOCUMENTS

| | | | | |
|---|---|---|---|---|
| 3,342,916 A | * | 9/1967 | Peters | 264/536 |
| 3,579,620 A | * | 5/1971 | Pettersson | 264/520 |
| 3,928,522 A | * | 12/1975 | Farrell | 264/530 |
| 4,123,217 A | * | 10/1978 | Fischer et al. | 425/525 |
| 2003/0102605 A1 | | 6/2003 | Rutenbeck et al. | |
| 2004/0245678 A1 | | 12/2004 | Belcher | |

FOREIGN PATENT DOCUMENTS
EP   0 346 518 A1   12/1989
JP   08-323845 A   12/1996
* cited by examiner

*Primary Examiner* — Robert B Davis
(74) *Attorney, Agent, or Firm* — Sughrue Mion, PLLC (57) ABSTRACT

The invention relates to a mold for the production by means of blowing or blow-drawing of thermoplastic containers which are equipped with an integral handle. According to the invention, two mold halves are provided with two respective inserts which can move transversely to the contact faces. Each of the aforementioned inserts comprises two telescopic pistons, namely: a main piston having a front thrust face, and a secondary piston which is housed in the main piston and which has a curvilinear front weld face. The secondary pistons are moved after the main pistons have applied two wall zones of the container body against one another.

14 Claims, 6 Drawing Sheets

MOLD, METHOD AND INSTALLATION FOR BLOW-MOLDING THERMOPLASTIC CONTAINERS PROVIDED WITH AN INTEGRAL HANDLE, AND CONTAINER THUS PRODUCED

FIELD OF THE INVENTION

The present invention relates to improvements made in the field of the manufacture, by blow molding or stretch-blow molding of heated preforms, of containers made of thermoplastic material, in particular a polyolefin such as polypropylene, provided with an integral handle, and it relates more specifically to a blow mold for producing containers of this type, said mold comprising at least two mold halves which
- are movable relative to one another,
- have respective mutual contact faces defining, in a closed position, a junction plane,
- have respectively two imprints which, joined together, define a molding cavity of the body and the shoulder of the final container, and
- comprise respectively two recesses which are substantially perpendicular to said respective contact faces and substantially mutually aligned in the closed position of the mold and which enclose two respective inserts forming pistons which can be moved pneumatically between
  - a retracted position in which the two inserts are returned, at least for the most part, into their respective recesses and
  - an extended position in which the two inserts are pushed together by pinching two given wall zones of the body of the container until said two wall zones of the body, which are then heat-welded together, are brought into mutual contact.

DESCRIPTION OF THE PRIOR ART

Various molds arranged in this way for the purposes of manufacturing aforementioned containers are already known (see, for example, documents FR 2 292 573, EP 0 346 518, EP 1 169 231, U.S. Pat. No. 6,733,716).

The object of the invention is basically to propose a mold of this type which is more effective than currently known molds and which allows the production of containers having an integral handle at a high rate (typically about 1,500 containers per hour) comparable to the production rate of thermoplastic containers which have the same capacity but are not provided with a handle.

SUMMARY OF THE INVENTION

For this purpose, according to a first of its aspects, the invention proposes a mold as mentioned in the preamble that is characterized, being configured in accordance with the invention, in that each insert comprises two pistons telescoped one within the other, namely a main piston or thrust piston having a centrally located front thrust face and, accommodated in said main piston, a coaxially arranged secondary piston or welding piston having a front face surrounding said front face of the main piston along a closed contour coinciding with the periphery of said wall zone of the body of the container, heating means being provided for keeping at least said front face of the secondary piston at the softening temperature of the thermoplastic material, the two pistons, the main piston and the secondary piston, being arranged in such a way that
- in a first operating phase, the main piston is moved from its retracted position to its protruding position, whereas the secondary piston remains retracted in said main piston, the front face of said main piston pushing said given zone of the wall of the body of the container, and
- in a second operating phase, the secondary piston is moved relative to the main piston from its retracted position to its protruding position in such a way that its hot front face rests against the periphery of said wall zone of the body of the container in order to soften the material thereof, to weld it peripherally tight with the wall zone pushed by the opposing piston, and at least to premark the perimeter of this wall zone.

Due to this arrangement, a distinction is drawn between the phase for the pushing of the material (or "boxing") with parts having a relatively low temperature and a very brief welding phase with very hot parts which, in view of the knife-like shape given to these parts, allows the central blank to be detached easily at the end of the cycle or subsequently. This allows a time for forming the handle that is very short (typically about 0.6 s) and does not disadvantageously stretch out the time of the manufacturing cycle (typically about 3 s).

In a preferred embodiment, provision is made for each insert further to comprise:
- at least one main pressurized gas supply channel which opens into a chamber of said recess to push said main piston into its protruding position,
- means for returning the main piston from its protruding position to its retracted position,
- at least one secondary pressurized gas supply channel which opens into the bottom of said aperture to push said secondary piston into its protruding position,
- means for returning the secondary piston from its protruding position to its retracted position, and
- control means arranged so as to supply with pressurized gas selectively first the main channel so as to move the main piston with the secondary piston in the retracted position in said first operating phase, then the secondary channel so as to move the secondary piston in said second operating phase.

Such an arrangement allows the means according to the invention to be operated based on gas under low pressure (typically air at a pressure of about $7 \times 10^5$ Pa) which is commonly available in blow molding machines.

In a simple manner, the secondary channel can comprise at least one calibrated conduit extending in the main piston between its end face turned toward the chamber of the recess and its end face forming the bottom of said aperture accommodating the secondary piston, whereby, when the main piston abuts in its protruding position, the pressurized gas supplied in the recess passes, through the calibrated conduit, into the recess in order to push the secondary piston to its protruding position; advantageously, in order to obtain balanced operation of the moving parts, the secondary channel comprises a plurality of calibrated conduits distributed over the perimeter of the main piston.

In a preferred embodiment, the front thrust face of the main piston pertains to a front plate located centrally and supported by an axial stem integral with the main piston and the secondary piston is centrally hollowed and surrounds said stem.

In an embodiment which is simple to carry out, the heating means are suitable for heating the secondary piston and comprise at least one electric cartridge heater accommodated in a respective bore in the secondary piston; preferably therefore, the heating means comprise a plurality of electric cartridge heaters accommodated in respective bores distributed over the perimeter of the secondary piston.

For correct operation of the mold, it is convenient that the main piston, which pushes the wall zone of the body of the container, remains at a low temperature, despite the presence of the secondary piston which is kept permanently at an elevated temperature. For this purpose, in order thermally to disassociate the two pistons, the main piston and the secondary piston, provision is made for a cooling gas to be blown in between the main piston and the secondary piston to keep the main piston at a temperature substantially lower than the softening temperature of the thermoplastic material. In this way, the main piston remains at a temperature of between 50° C. and 100° C. whereas the secondary piston is brought to a temperature greater than that of the main piston in a range between 130° C. and 200° C., advantageously between 150° C. and 190° C.

In a preferred embodiment, the front face of the secondary piston is shaped in the manner of a knife extending along said closed contour so as to facilitate the premarking or even the cutting-up of the central blank releasing the aperture from the handle.

Beneficially, the means for returning the main piston from its protruding position to its retracted position are pneumatic means, the main piston and its recess being arranged so as to form a double acting cylinder.

Also beneficially, the means for returning the secondary piston comprise at least one return spring interposed between the main piston and the secondary piston.

The invention can find an application of interest in a rotary molding installation for manufacturing, by blow molding or stretch-blow molding of heated preforms, containers made of thermoplastic material and provided with an integral handle, said installation comprising a rotary carousel equipped with a multiplicity of molds distributed over its perimeter, and being characterized by the fact that the molds are arranged as stated hereinbefore.

The invention can also find an application of interest in a fixed molding installation for manufacturing, by blow molding or stretch-blow molding of heated preforms, containers made of thermoplastic material and provided with an integral handle, said installation comprising a plurality of molds supported in a substantially fixed manner in a line, and being characterized by the fact that the molds are arranged as stated hereinbefore.

According to another of its aspects, the invention proposes a method for manufacturing, by blow molding or stretch-blow molding of a heated preform, a container made of thermoplastic material, in particular a polyolefin such as polypropylene, provided with an integral handle by use of a mold comprising at least two mold halves which are movable relative to one another, have respective mutual contact faces defining, in a closed position, a junction plane, have respectively two imprints which, joined together, define a molding cavity of the body and the shoulder of the final container, and comprise respectively two recesses which are substantially perpendicular to said respective contact faces and substantially mutually aligned in the closed position of the mold and which enclose two respective inserts forming pistons which can be moved pneumatically between a retracted position in which the two inserts are returned, at least for the most part, into their respective recesses and an extended position in which the two inserts are pushed together by pinching two given wall zones of the body of the container until said two wall zones of the body, which are then heat welded together, are brought into mutual contact, said method being characterized, according to the invention, in that each insert is formed with two pistons telescoped one within the other, namely a main piston or thrust piston having a centrally located front thrust face and, accommodated in said main piston, a coaxially arranged secondary piston or welding piston having a front face surrounding said front face of the main piston along a closed contour coinciding with the periphery of said wall zone of the body of the container, in that heating means are provided for keeping at least said front face of the secondary piston at the softening temperature of the thermoplastic material, and in that the two pistons, the main piston and the secondary piston, are configured in such a way that in a first operating phase, the main piston is moved from its retracted position to its protruding position, whereas the secondary piston is kept retracted in said main piston, the front face of said main piston pushing said given zone of the wall of the body of the container, and in a second operating phase, the secondary piston is moved relative to the main piston from its retracted position to its protruding position in such a way that its hot front face rests against the periphery of said wall zone of the body of the container in order to soften the material thereof, to weld it peripherally with the wall portion pushed by the opposing piston, and at least to premark the perimeter of this wall zone.

BRIEF DESCRIPTION OF THE DRAWINGS

The invention will be better understood on reading the following detailed description of some preferred embodiments given merely by way of non-limiting examples. In the present description, reference will be made to the appended drawings, in which.

DETAILED DESCRIPTION OF THE INVENTION

Figure 1A:
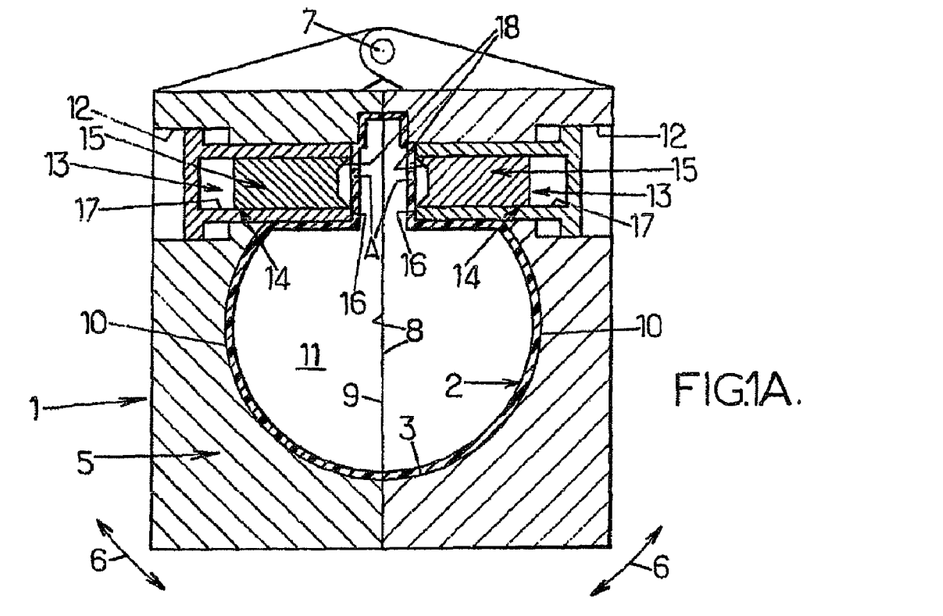
FIGS. 1A, 1B and 1C are schematic representations of a blow mold configured in accordance with the invention, shown respectively in a sectional plan view in three different operating positions.
Figure 1B:
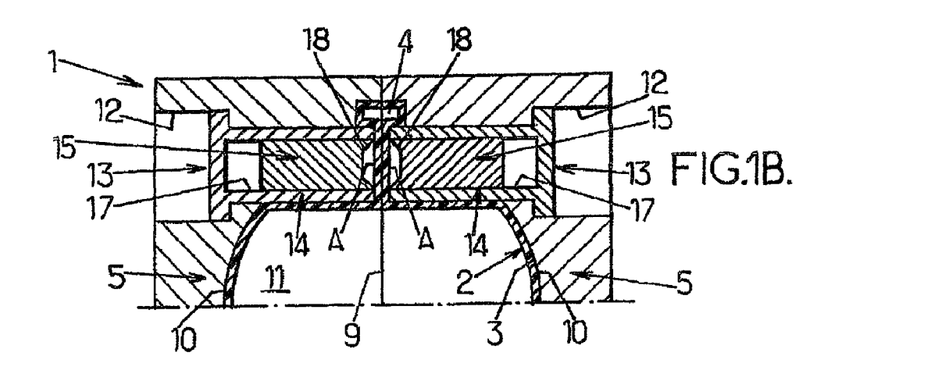
Figure 1C:
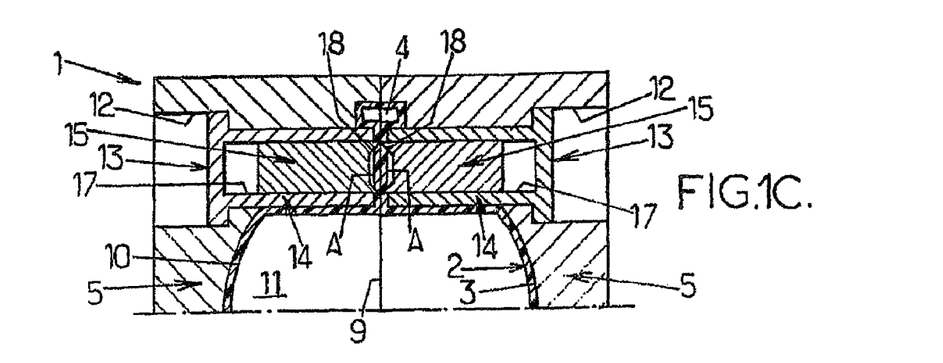

Reference will be made first of all to FIGS. 1A to 1C showing in cross section (complete in FIG. 1A and partial in FIGS. 1B and 1C) a mold 1 for manufacturing, by blow molding or stretch-blow molding, a container 2 made of thermoplastic material, of which there can be seen only the body 3 provided with an integral handle 4 (which can be seen in FIG. 1C).

The mold 1, in the simplified representation given in FIGS. 1A to 1C, comprises at least two mold halves 5 (to which there is generally added an axially movable mold base which cannot be seen).

The two mold halves 5 are movable relative to each other, in particular in rotation (arrows 6) about a common pivot axis illustrated by reference numeral 7.

The mold halves 5 have respective mutual contact faces 8 defining, in the closed position, a junction plane 9.

The mold halves 5 have respectively two imprints 10 which, joined together when the mold is in the closed position, define a molding cavity 11 of the body 3 and the shoulder of the container 2.

Finally, the mold halves 5 comprise respectively two recesses 12 which are substantially perpendicular to said respective contact faces 8 and substantially mutually aligned in the closed position of the mold and which enclose two respective inserts 13 forming assemblies which can be moved pneumatically between a retracted position (FIG. 1A) in which the two inserts are returned, at least for the most part, into their respective recesses 12 and an extended position (FIGS. 1B, 1C) which will be examined more explicitly hereinafter.

Moreover, the mold 1 can be configured in any appropriate manner in accordance with the requirements imposed by the formation of the integral handle.

In the context of the present invention, provision is made for each insert 13 to comprise two pistons 14 and 15 respectively, telescoped one within the other, namely a main piston or thrust piston 14 and a secondary piston or welding piston 15, which, in the context of the general configuration of the mold, are both activated pneumatically.

The main piston or thrust piston (or "boxing" piston) 14 is received in one of said recesses 12 and has a front thrust face 16.

The secondary piston or welding piston 15 is arranged coaxially in an axial bore 17 in the main piston 14 and has a front face 18 extending transversely along a closed contour coinciding with the periphery of a given wall zone A of the body 3 of the container 2. In addition, this front face 18 of the secondary piston 15 is shaped with a fine front end so as to form a knife extending along said closed contour. Heating means (not shown) are provided to keep at least said front face 18 of the secondary piston 15 at the softening temperature of the thermoplastic material.

The mode of operation of the above-described means is as follows.

In the rest position illustrated in FIG. 1A, the secondary pistons 15 are retracted in the bores 17 in the respective main pistons 14, and the main pistons 14 are themselves retracted in the respective recesses 12 in the mold halves 5. If the body 3 of the container to be produced has substantial curvature in the zone in which the handle has to be formed, as in the case illustrated in FIG. 1A, the main pistons 14 cannot be fully retracted inside the respective recesses 12 and their front end passes partly into the cavity 11 of the mold 1, as can be seen in FIG. 1A.

In a first operating phase illustrated in FIG. 1B, which can start at the same time as the final blow molding phase of the container (blow molding under elevated pressure—typically under a pressure of about $40 \times 10^5$ Pa—following a phase of drawing and pre-blow molding under reduced pressure), the main pistons 14 are moved toward each other from their retracted position to their protruding position, whereas the secondary pistons 15 remain retracted in said respective main pistons 14. During this movement, the respective front faces 16 of said main pistons 15 push the given portions A located symmetrically either side of the junction plane 9. Finally, the two wall zones A are brought into contact with each other along the junction plane 9, as can be seen in FIG. 1B, under the respective thrust actions of the two main pistons 14 moved jointly toward each other.

In a second, terminal operating phase illustrated in FIG. 1C, the secondary pistons 15 are moved toward each other, relative to the respective main pistons 14, from their retracted position to their protruding position. Thus, the respective hot front faces 18 of these two secondary pistons 15 rest against the periphery of said wall zones A of the body 3 of the container 2 in order to soften the material thereof and to weld them peripherally tight together as shown in FIG. 1C. At the same time, because they are shaped in a knife-like manner, the front faces 18 cut into the softened thermoplastic material and section, or at least premark with a view to subsequent sectioning, the blank formed by the double wall zone A located inside said periphery.

In order to allow the abovementioned mode of operation to be carried out as intended, it is advantageous that each insert 13 further comprises:

- at least one main pressurized gas supply channel (not shown) which opens into the bottom or chamber of said recess 12 to push said main piston 14 into its protruding position,
- means for returning the main piston 14 from its protruding position to its retracted position, wherein said return means can be of various types (return springs, main piston 14 and recess 12 configured to form a double acting cylinder),
- at least one secondary pressurized gas supply channel (not shown) which opens into the bottom of said aperture 17 to push said secondary piston 15 into its protruding position,
- means for returning the secondary piston 15 from its protruding position to its retracted position, wherein said return means can be of various types (return springs, main piston 15 and aperture 17 configured to form a double acting cylinder), and
- control means arranged so as to supply with pressurized gas selectively first the main channel so as to move the main piston 14 with the secondary piston 15 remaining in the retracted position during said first operating phase, then the secondary channel so as to move the secondary piston 15 during said second operating phase.

Figure 2:
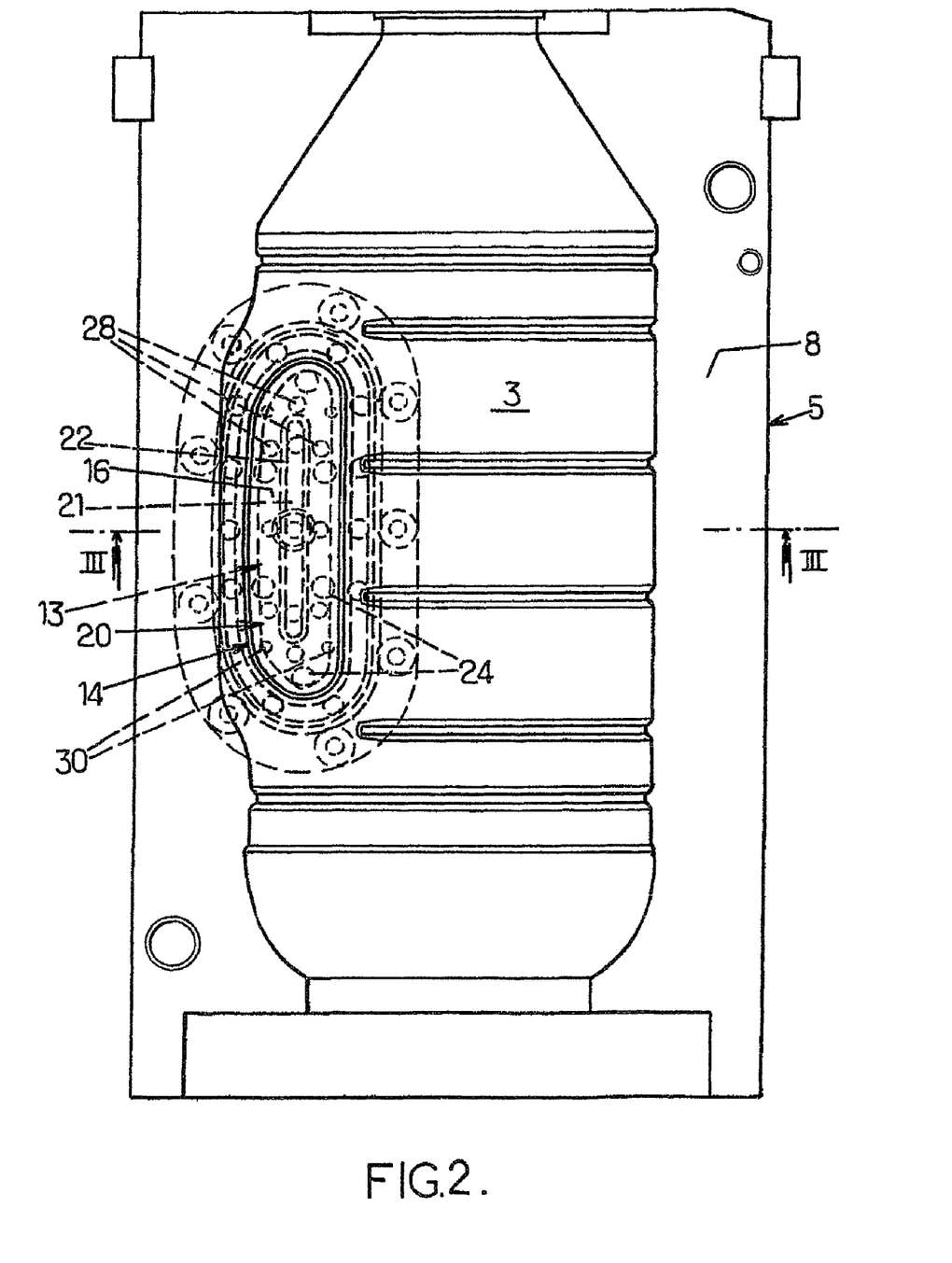
FIG. 2 is a front view of a mold half configured in accordance with the invention.
Figure 3:
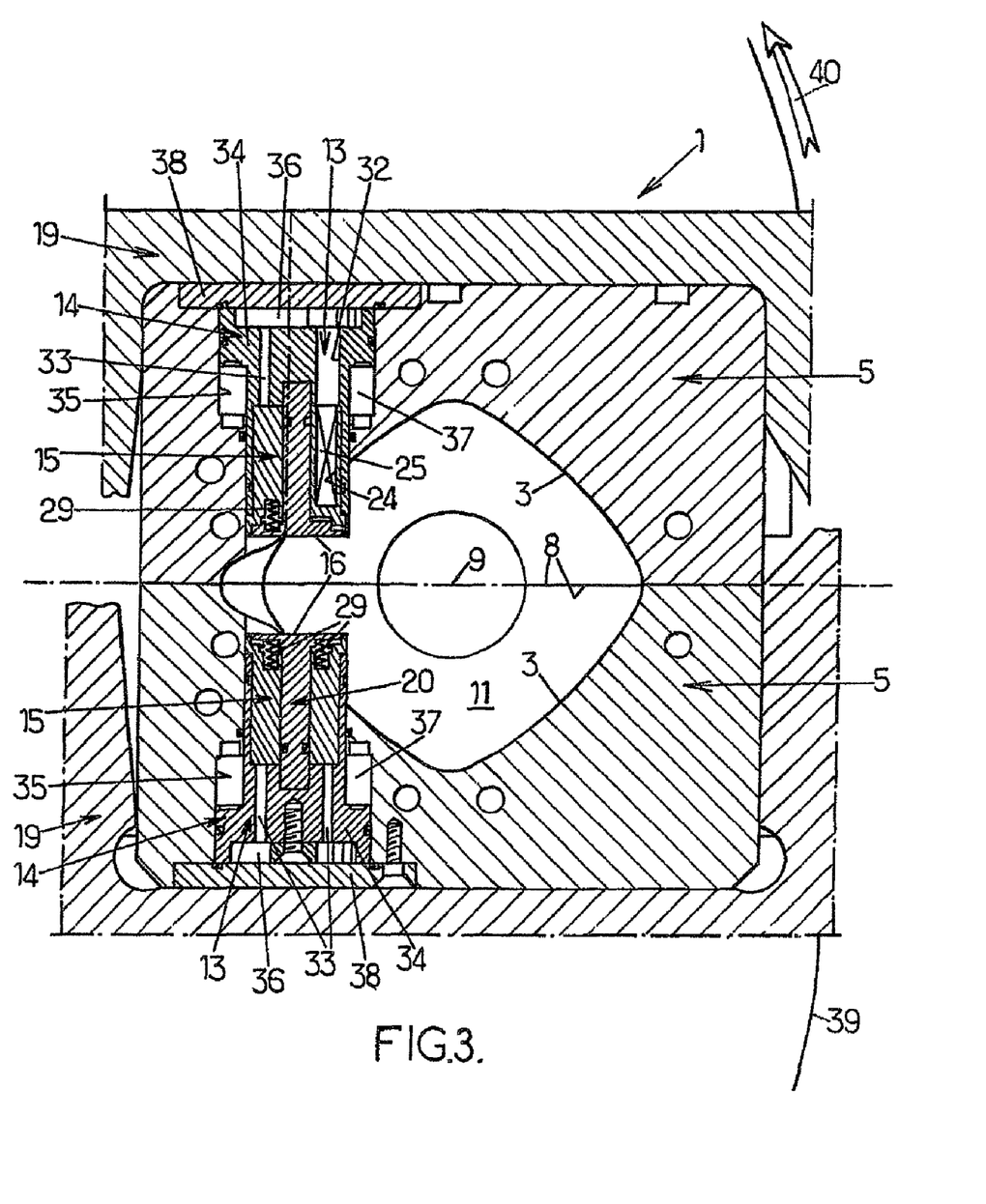
FIG. 3 is a cross section, taken along the line III-III, of the mold of FIG. 2.

FIGS. 2 and 3 (in which the same reference numerals are retained to denote the portions or elements identical to those respective portions or elements from FIGS. 1A to 1C) illustrate in detail a specific embodiment of a mold arranged in accordance with the invention.

FIG. 2 shows only a front view of one of the mold halves 5, in which the imprint 3 hollowed in the contact face 8 of the mold half corresponds to a form of container given merely by way of example. The insert 13 associated with this mold half 5 is shown head-on.

FIG. 3 shows, in cross section taken along the line III-III from FIG. 2, the two mold halves 5 in the closed position; in the illustrated example, the two mold halves 5 are engaged in respective partially shown mold carriers 19. The two insert 13 are arranged in an identical manner to that set out hereinafter with reference to FIG. 4, which is an exploded view of all of the inserts, and to FIGS. 5 to 8, which show individually the main components thereof to improve understanding.

Figure 4:
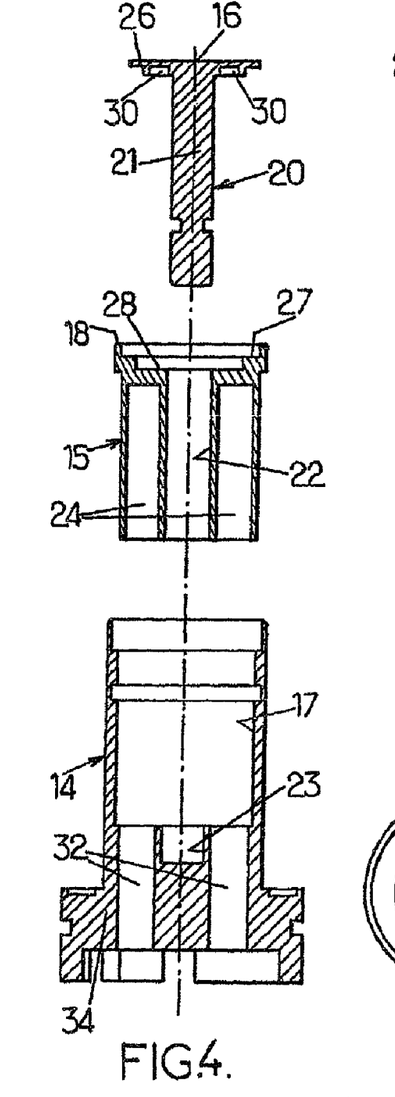
FIG. 4 is an exploded side view, in cross section, of three main component parts of an insert of the mold from FIGS. 2 and 3.
Figure 5:
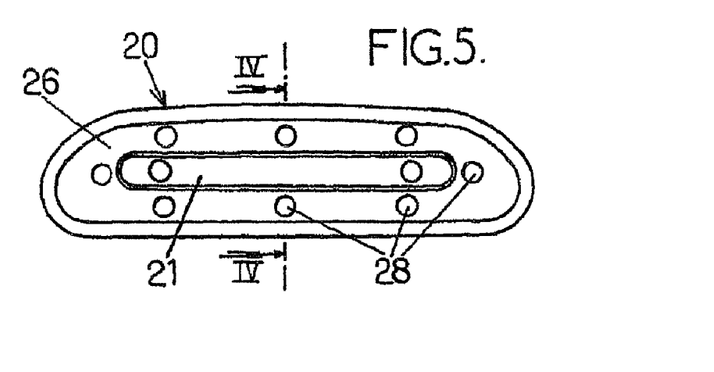
FIGS. 5 and 6 are views from below and FIG. 7 is a plan view respectively of the three parts illustrated in FIG. 4.
Figure 6:
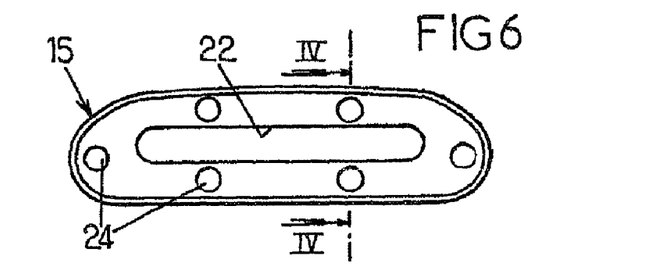

In each insert 13, the main piston 14 is arranged with a front thrust face 16 pertaining to a transverse plate 26 of a part 20 (upper part in FIG. 4 shown in cross section, taken along the line IV-IV from FIG. 5, and from below in FIG. 5) having in cross section a general T-shape, the stem 21 of which is engaged through the secondary piston 15 which is, for this purpose, hollowed centrally at 22 and surrounds said stem 21. The base of the stem 21 is fitted in a complementarily shaped hollow 23 provided in the main piston 14 and is joined thereto, for example by screwing. The main piston 14 thus formed has a thrust face 16 which is substantially planar and which spreads over a large surface area shaped along the inner contour of the handle to be formed (it is this thrust face 16 which can basically be seen in the representation of the insert in FIG. 2). Axially, the dimensions of the part 20 are such as to leave the play required for movement of the secondary piston 15.

The secondary piston 15 (part at the center of FIG. 4 shown in cross section, taken along the line IV-IV front FIG. 6, and from below in FIG. 6), which is hollowed centrally at 22, is provided with a plurality of blind bores 24 which are open toward the bottom and distributed over the perimeter thereof. These bores 24 receive electric heating means in the form of cartridge heaters 25 (one of which is shown schematically in FIG. 3). The front end (raised in FIG. 4) of the piston 15 is hollowed with an aperture 27, the shape of which is complementary to that of the plate 26 in such a way that when the piston 15 is pushed in the protruding position, the plate 26 of the part 20 can withdraw into this aperture 27. In addition, this aperture 27 is, for its part, hollowed centrally at 28 to support the ends of return springs 29 interposed between the piston 15 and the plate 26 which is integral with the piston 14, which plate 26 is, for this purpose, provided with apertures 30 receiving the opposing ends of the springs 29. The springs 29 are distributed over the perimeter of the plate 26 and the secondary piston 15.

Figure 8:
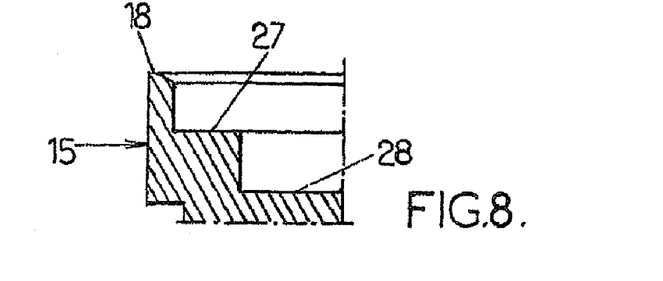
FIG. 8 is an enlarged view of a portion of the part from FIG. 4 shown from below in FIG. 6.

A portion of the front end of the secondary piston 15 is shown on a greatly enlarged scale in FIG. 8 so as to make clearer the shape of the front face 18 of the secondary piston 15 that is formed by the edge of the wall delimiting the aperture 27. This edge is internally chamfered so as to form a fine front face 18 shaped in the manner of a knife extending along a closed contour corresponding to the shape of the end of the secondary piston 15. The front face 18, brought into contact with the thermoplastic material can thus form a heating part suitable for softening the thermoplastic material and to be embedded therein once softened in order to cut up or at least premark the material blank which it surrounds.

Figure 7:
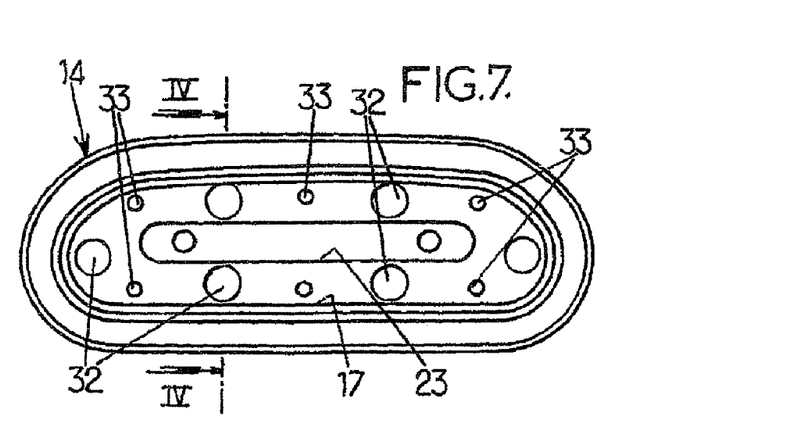

Finally, the main piston 14 (part at the bottom of FIG. 4 shown in cross section, taken along the line IV-IV from FIG. 7, and from above in FIG. 7) is, for its part, provided with two sets of bores alternating with each other as can be seen in FIG. 7:

bores 32 are located facing the bores 24 of the secondary piston 15 and pass through the bottom of the main piston 14 between its end face turned toward the bottom of the recess 12 and its end face forming the bottom of the aperture 17 accommodating the secondary piston 15; the bores 32 form passages for the electric supply wires of the cartridge heaters 25;

bores 33 are located facing filled zones of the secondary piston 15 and pass through the bottom of the main piston 14 between its end face turned toward the bottom of the recess 12 and its end face forming the bottom of the aperture 17 accommodating the secondary piston 15; these bores 33 are formed as calibrated bores forming restrictions, the purpose of which will be disclosed hereinafter.

The main piston 14 is equipped with a widened piston head 34 which is tightly engaged in a portion 35, itself widened, of the recess 12. Two chambers 36 and 37 respectively are thus formed either side of the piston head 34, as can be seen in FIG. 3, in such a way that the main piston 14 and the recess 12 form a double acting pneumatic cylinder (the pressurized fluid supply channels not being shown).

Figure 9A:
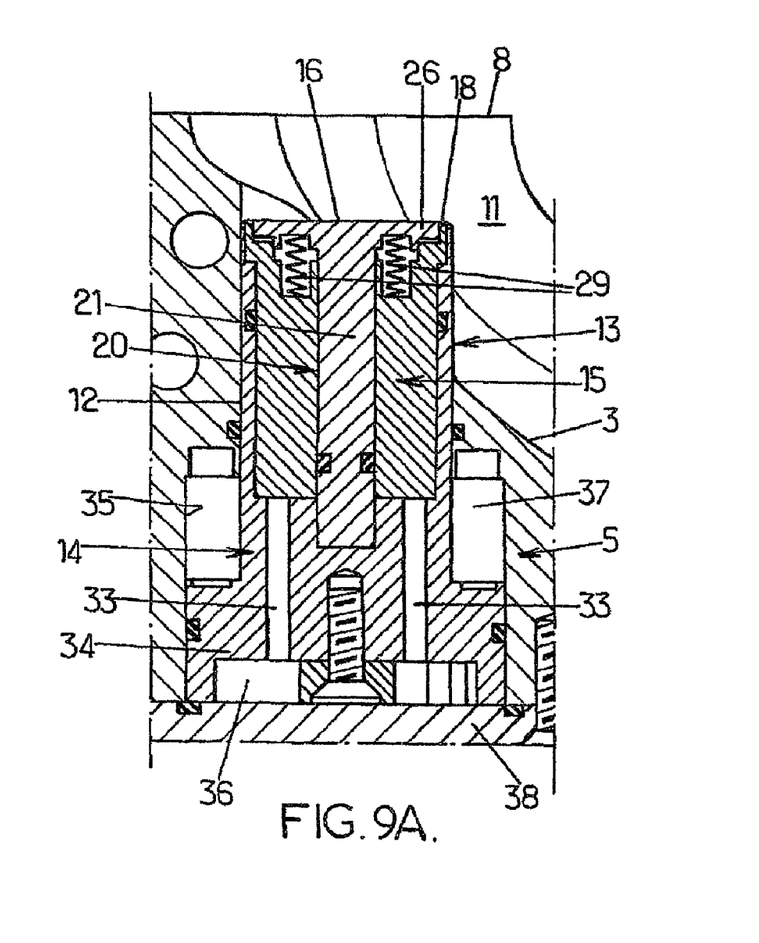
FIGS. 9A to 9C are enlarged views in cross section of an insert of the mold from FIGS. 2 and 3 shown respectively in three operating positions.
Figure 9B:
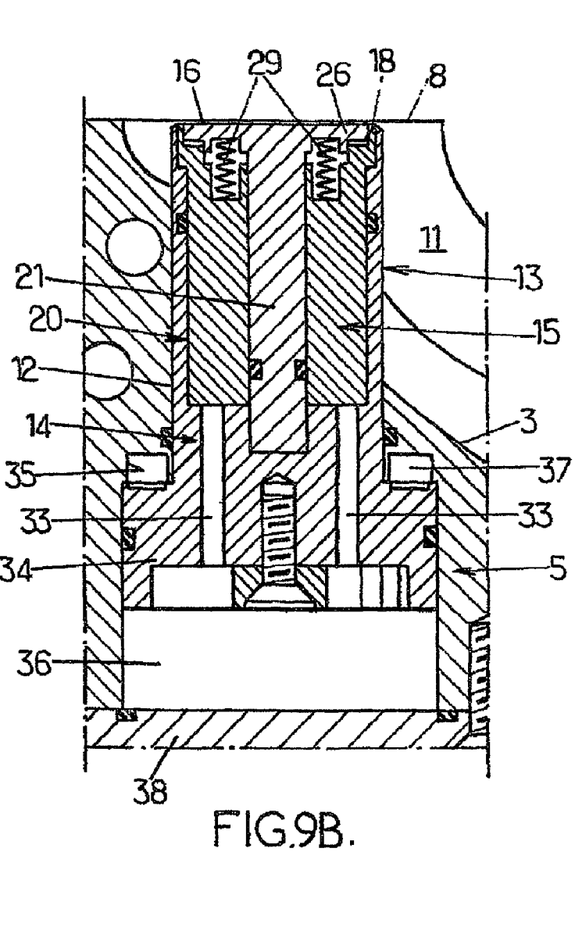
Figure 9C:
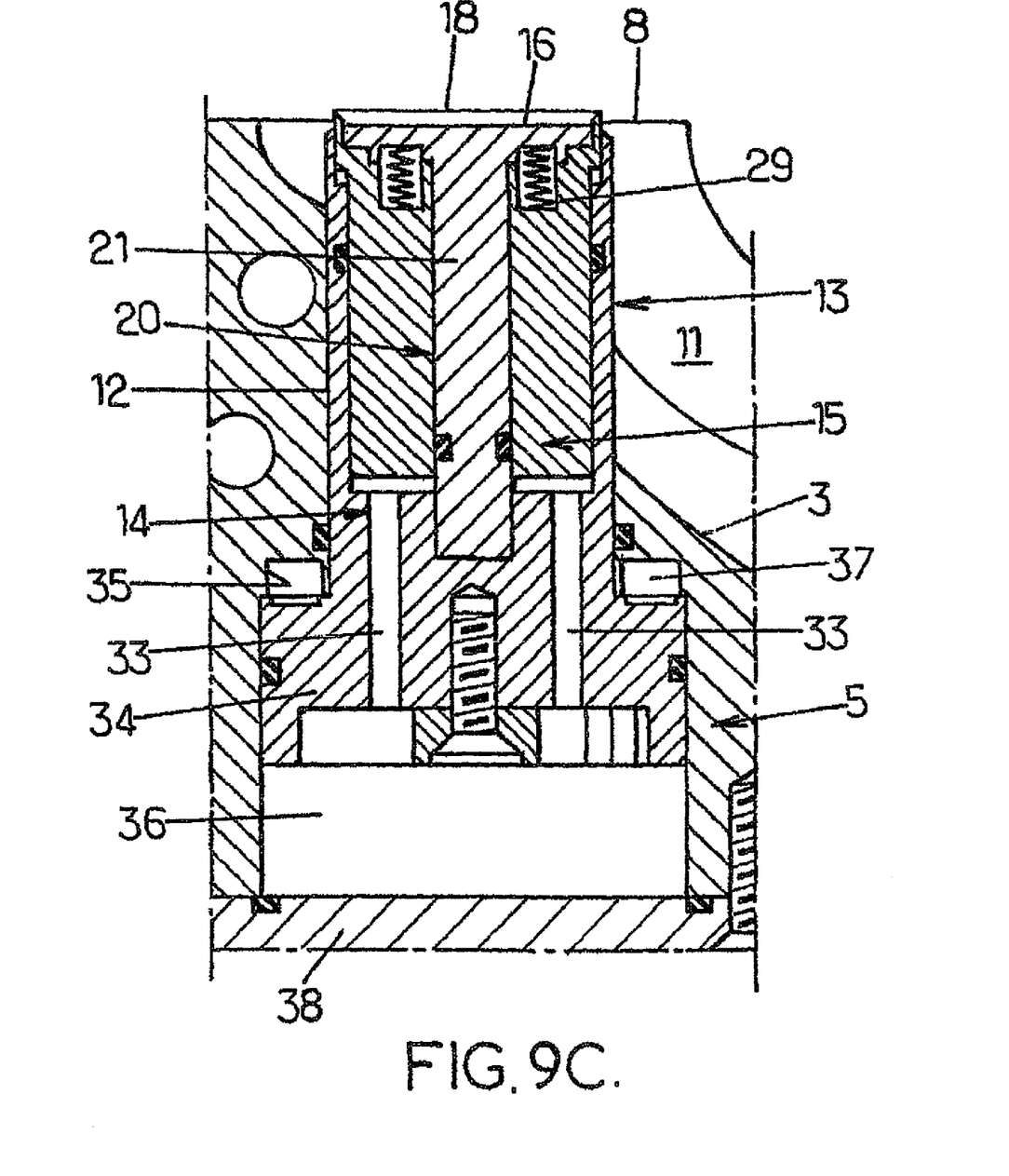

The mode of operation of the above-described device will now be disclosed with reference to FIGS. 9A to 9C showing in isolation an insert 13 on a greatly enlarged scale in three different operating position.

In the retracted or rest position of the insert 13 shown in FIG. 9A, the main piston rests against the bottom of the recess 12 (consisting in this case of a plate 38 fixed by screwing to the body of the mold half 5). The secondary piston 15 is, for its part, held in the retracted position in the main piston 14 under the action of the return springs 29, in which position the thrust face 16 is held in the plane of the front face 18 of the secondary piston 15 or slightly in front of this edge.

During the phase for the high-pressure blow molding of the body of the container, pressurized fluid is admitted into the chamber 36 and, under the thrust of this fluid, the insert 13 is pushed in its entirety until the head 34 of the main piston 14 abuts the opposite end of the widened portion 35 of the recess 12, as shown in FIG. 9B. In this position, the thrust face 16, which has pushed the wall zone A of the container body, is set back slightly (typically by about 0.3 mm) from the junction plane 9.

At this moment, the pressure of the fluid having passed through the calibrated bores 33 reaches its maximum value and pushes the secondary piston 15 counter to the antagonistic stresses of the springs 29. As can be seen in FIG. 9C, the front face 18 protrudes beyond the thrust face 16 and reaches substantially up to the junction plane 9. As the secondary piston 15 is heated to the softening temperature of the thermoplastic material under the action of the cartridge heaters 25, the front face 18 softens the thermoplastic material over the perimeter of the zone A. The two zones A, brought closer together by the concomitant movements of the two inserts 13, are thus welded together peripherally, resulting in the tight closure of the body of the container and the tight closure of the hollow handle. At the same time, the thin front faces 18 act as two opposing knives and penetrate the softened material; they cut up the double zone A or premark it for the purposes of subsequent removal thereof.

Subsequently, the pressurized fluid is evacuated out of the chamber 36 in such a way that the springs 29 bring the secondary piston 15 into the retracted position. Then, the introduction of pressurized fluid into the chamber 37 brings the main piston 14, and accordingly the entire insert 13, into its initial position.

The heating cartridges 25 keep the whole of the secondary piston at all times at the softening temperature of the thermoplastic material. However, correct deformation of the thermoplastic material during the pushing phase of the zones A requires this material to be at a temperature substantially lower than the softening temperature and therefore the thrust face 16 to be at a temperature lower than this softening temperature. In order to avoid excessive heating of the main piston 14 and of the part 20 integral therewith in the presence of the secondary piston, a cooling gas is blown into the gap (structural clearance) between the opposing surfaces of the secondary piston 15 and the bore 17 of the main piston 14.

The mold arrangement according to the invention is used particularly beneficially for containers made of a polyolefin, the glass transition temperature of which is substantially lower than ambient temperature (#20° C.) and, in particular, for containers made of polypropylene.

For a thermoplastic material such as polypropylene, the softening temperature is approximately 170° C. Thus, the secondary piston is kept at a temperature of between 130° C. and 200° C., advantageously between 150° C. and 190° C., whereas the main piston is kept at a temperature of between 50° C. and 100° C. (in view of the fact that, moreover, the mold halves 5 are cooled to a temperature of approximately 75° C. by circulation of cold water in internal conduits provided in the mold halves).

The provisions according to the invention can find an application of interest in a rotary molding installation for manufacturing, by blow molding or stretch-blow molding of heated preforms, containers made of thermoplastic material and provided with an integral handle, said installation comprising a rotary carousel equipped with a multiplicity of molds distributed over its perimeter and arranged as stated hereinbefore; in FIG. 3, reference numeral 39 denotes the support plate of the molds 1, the rotation of this plate being indicated by the arrow 40.

The provisions according to the present invention can also find an application of interest in a fixed molding installation for manufacturing, by blow molding or stretch-blow molding of heated preforms, containers made of thermoplastic material and provided with an integral handle, said installation comprising a plurality of molds supported in a substantially fixed manner in a line and arranged as stated hereinbefore, this type of installation being suitable, in particular, for the manufacture of containers made of a polyolefin, such as polypropylene, and intended for the packaging of household products (for example detergents, liquid detergents, etc.).

Due to the implementation of the provisions of the invention, a molding installation arranged as above-mentioned is able to achieve high production rates of approximately, for example, 1,500 containers per hour.

Presented under a different aspect of the invention, the containers 2 made of thermoplastic material, in particular a polyolefin such as polypropylene, and provided with an integral handle 4 are manufactured by blow molding or stretch-blow molding of a heated preform by use of a mold 1 comprising at least two mold halves 5 which
- are movable relative to one another,
- have respective mutual contact faces 8 defining, in a closed position, a junction plane 9,
- have respectively two imprints 10 which, joined together, define a molding cavity 11 of the body 3 and the shoulder of the final container 2, and
- comprise respectively two recesses 12 which are substantially perpendicular to said respective contact faces 8 and substantially mutually aligned in the closed position of the mold 1 and which enclose two respective inserts 13 forming pistons which can be moved pneumatically between
  - a retracted position in which the two inserts 13 are returned, at least for the most part, into their respective recesses 12 and
  - an extended position in which the two inserts 13 are pushed together by pinching two given wall zones A of the body 3 of the container until said two wall zones A of the body 3, which are then heat-welded together, are brought into mutual contact.

In this context, the method according to the invention is characterized
in that each insert 13 is formed by two pistons 14, 15 telescoped one within the other, namely a main piston 14 or thrust piston having a centrally located front thrust face 16 and, accommodated in said main piston 14, a coaxially arranged secondary piston 15 or welding piston having a front face 18 surrounding said front face 16 of the main piston along a closed contour coinciding with the periphery of said wall zone A of the body of the container,
in that heating means 25 are provided for keeping at least said front face 18 of the secondary piston 15 at the softening temperature of the thermoplastic material,
and in that the two pistons, the main piston and the secondary piston 14, 15, are configured in such a way that
  in a first operating phase, the main piston 14 is moved from its retracted position to its protruding position, whereas the secondary piston 15 is kept retracted in said main piston, the front face 16 of said main piston pushing said given zone A of the wall of the body of the container, and
  in a second operating phase, the secondary piston 15 is moved relative to the main piston 14 from its retracted position to its protruding position in such a way that its hot front face 18 rests against the periphery of said wall zone A of the body of the container in order to soften the material thereof, to weld it peripherally with the wall portion pushed by the opposing piston, and at least to premark the perimeter of this wall zone A.

The invention claimed is:

1. A mold for manufacturing, by blow molding or stretch-blow molding of a heated preform, a container made of thermoplastic material, in particular a polyolefin such as polypropylene, provided with an integral handle, said mold comprising at least two mold halves which
  are movable relative to one another,
  have respective mutual contact faces defining, in a closed position, a junction plane,
  have respectively two imprints which, joined together, define a molding cavity of the body and the shoulder of the final container, and
  comprise respectively two recesses which are substantially perpendicular to said respective contact faces and substantially mutually aligned in the closed position of the mold and which enclose two respective inserts forming pistons which can be moved pneumatically between
    a retracted position in which the two inserts are returned, at least for the most part, into their respective recesses and
    an extended position in which the two inserts are pushed together by pinching two given wall zones of the body of the container until said two wall zones of the body, which are then heat-welded together, are brought into mutual contact,
wherein each insert comprises two pistons telescoped one within the other, namely a main piston or thrust piston having a centrally located front thrust face and, accommodated in said main piston, a coaxially arranged secondary piston or welding piston having a front face surrounding said front face of the main piston along a closed contour coinciding with the periphery of said wall zone of the body of the container, heating means being provided for keeping at least said front face of the secondary piston at the softening temperature of the thermoplastic material, the two pistons, the main piston and the secondary piston, being arranged in such a way that
  in a first operating phase, the main piston is moved from its retracted position to its protruding position, whereas the secondary piston remains retracted in said main piston, the front face of said main piston pushing said given zone of the wall of the body of the container, and
  in a second operating phase, the secondary piston is moved relative to the main piston from its retracted position to its protruding position in such a way that its hot front face rests against the periphery of said wall zone of the body of the container in order to soften the material thereof, to weld it peripherally with the wall portion pushed by the opposing piston, and at least to premark the perimeter of this wall zone.

2. The mold as claimed in claim 1, wherein each insert further comprises:
at least one main pressurized gas supply channel which opens into a chamber of said recess to push said main piston into its protruding position,
means for returning the main piston from its protruding position to its retracted position,
at least one secondary pressurized gas supply channel which opens into the bottom of said aperture to push said secondary piston into its protruding position,
means for returning the secondary piston from its protruding position to its retracted position, and
control means arranged so as to supply with pressurized gas selectively first the main channel so as to move the main piston with the secondary piston in the retracted position in said first operating phase, then the secondary channel so as to move the secondary piston in said second operating phase.

3. The mold as claimed in claim 2, wherein the secondary channel comprises at least one calibrated conduit extending in the main piston between its end face turned toward the chamber of the recess and its end face forming the bottom of said aperture accommodating the secondary piston, whereby, when the main piston abuts in its protruding position, the pressurized gas supplied in the recess passes, through the calibrated conduit, into the recess in order to push the secondary piston to its protruding position.

4. The mold as claimed in claim 2, wherein the secondary channel comprises at least one calibrated conduit extending in the main piston between its end face turned toward the chamber of the recess and its end face forming the bottom of said aperture accommodating the secondary piston, and wherein the secondary channel comprises a plurality of calibrated conduits distributed over the perimeter of the main piston.

5. The mold as claimed in claim 1, wherein the front thrust face of the main piston pertains to a front plate located centrally and supported by an axial stem integral with the main piston and wherein the secondary piston is centrally hollowed and surrounds said stem.

6. The mold as claimed in claim 1, wherein the heating means are suitable for heating the secondary piston and comprise at least one electric cartridge heater accommodated in a respective bore in the secondary piston.

7. The mold as claimed in claim 6, wherein the heating means comprise a plurality of electric cartridge heaters accommodated in respective bores distributed over the perimeter of the secondary piston.

8. The mold as claimed in claim 1, wherein a cooling gas is blown in between the main piston and the secondary piston to keep the main piston at a temperature substantially lower than the softening temperature of the thermoplastic material.

9. The mold as claimed in claim 1, wherein the front face of the secondary piston is shaped in the manner of a knife extending along said closed contour.

10. The mold as claimed in claim 2, wherein the means for returning the main piston from its protruding position to its retracted position are pneumatic means, the main piston and its recess being arranged so as to form a double acting cylinder.

11. The mold as claimed in claim 2, wherein the means for returning the secondary piston comprise at least one return spring interposed between the main piston and the secondary piston.

12. A rotary molding installation for manufacturing, by blow molding or stretch-blow molding of heated preforms, containers made of thermoplastic material and provided with an integral handle, said installation comprising a rotary carousel equipped with a multiplicity of molds distributed over its perimeter, wherein the molds are arranged as claimed in claim 1.

13. A fixed molding installation for manufacturing, by blow molding or stretch-blow molding of heated preforms, containers made of thermoplastic material and provided with an integral handle, said installation comprising a plurality of molds supported in a substantially fixed manner in a line, wherein the molds are arranged as claimed in claim 1.

14. A method for manufacturing, by blow molding or stretch-blow molding of a heated preform, a container made of thermoplastic material, in particular a polyolefin such as polypropylene, provided with an integral handle by use of a mold comprising at least two mold halves which
are movable relative to one another,
have respective mutual contact faces defining, in a closed position, a junction plane,
have respectively two imprints which, joined together, define a molding cavity of the body and the shoulder of the final container, and
comprise respectively two recesses which are substantially perpendicular to said respective contact faces and substantially mutually aligned in the closed position of the mold and which enclose two respective inserts forming pistons which can be moved pneumatically between
a retracted position in which the two inserts are returned, at least for the most part, into their respective recesses and
an extended position in which the two inserts are pushed together by pinching two given wall zones of the body of the container until said two wall zones of the body, which are then heat welded together, are brought into mutual contact,
wherein
each insert is formed with two pistons telescoped one within the other, namely a main piston or thrust piston having a centrally located front thrust face and, accommodated in said main piston,
a coaxially arranged secondary piston or welding piston having a front face surrounding said front face of the main piston along a closed contour coinciding with the periphery of said wall zone of the body of the container,
heating means are provided for keeping at least said front face of the secondary piston at the softening temperature of the thermoplastic material,
and the two pistons, the main piston and the secondary piston, are configured in such a way that
in a first operating phase, the main piston is moved from its retracted position to its protruding position, whereas the secondary piston is kept retracted in said main piston, the front face of said main piston pushing said given zone of the wall of the body of the container, and
in a second operating phase, the secondary piston is moved relative to the main piston from its retracted position to its protruding position in such a way that its hot front face rests against the periphery of said wall zone of the body of the container in order to soften the material thereof, to weld it peripherally with the wall portion pushed by the opposing piston, and at least to premark the perimeter of this wall zone.

* * * * *